US012750556B2

(12) United States Patent
Kino et al.

(10) Patent No.: US 12,750,556 B2
(45) Date of Patent: Sep. 29, 2026

(54) CONTENT DISTRIBUTION SYSTEM, CONTENT DISTRIBUTION METHOD, AND PROGRAM

(71) Applicant: Avex Technologies Inc., Tokyo (JP)

(72) Inventors: Yutaka Kino, Tokyo (JP); Kosuke Ota, Tokyo (JP)

(73) Assignee: Avex Technologies Inc., Tokyo (JP)

(*) Notice: Subject to any disclaimer, the term of this patent is extended or adjusted under 35 U.S.C. 154(b) by 0 days.

(21) Appl. No.: 18/338,071

(22) Filed: Jun. 20, 2023

(65) Prior Publication Data

US 2024/0031656 A1 Jan. 25, 2024

(30) Foreign Application Priority Data

Apr. 20, 2022 (JP) ................................ 2022-069771

(51) Int. Cl.
*H04N 21/4784* (2011.01)
*G06Q 10/40* (2026.01)

(52) U.S. Cl.
CPC ......... *H04N 21/4784* (2013.01); *G06Q 10/40* (2026.01)

(58) Field of Classification Search
CPC ........... H04N 21/2187; H04N 21/4784; H04N 21/812; H04N 21/47815; H04N 21/2543; H04N 7/15
See application file for complete search history.

(56) References Cited

U.S. PATENT DOCUMENTS

2002/0112243 A1* 8/2002 Hunter ............. H04N 21/44204 725/115
2006/0080613 A1* 4/2006 Savant ................... G06Q 30/06 715/733
2012/0226588 A1* 9/2012 Wuhrer .................. G06Q 20/12 705/27.1
2013/0268377 A1* 10/2013 Jessup .................. G06Q 10/101 705/26.2
2015/0199703 A1* 7/2015 Pfeffer ............... G06Q 30/0226 705/14.27
2017/0006074 A1* 1/2017 Oates, III ........... H04N 21/2353
2018/0270541 A1* 9/2018 Chen .................... H04N 21/482
2020/0143447 A1* 5/2020 Wang ................. G06Q 30/0212
2023/0015800 A1* 1/2023 Cui .................... H04N 21/2143
2023/0023653 A1* 1/2023 Watanabe ............. A63F 13/428

FOREIGN PATENT DOCUMENTS

JP 2012-120098 A 6/2012

OTHER PUBLICATIONS

Manami Urabe, "Virtually free of charge is also possible 3 ways to get more with Rakuten Furusato Nozei," Master of Money, Nov. 23, 2020, https://manetatsu.com/2020/11/305232/.
Shopping marathon. Guide & shopping rules details. Rakuten, Aug. 1, 2020, https://event.rakuten.co.jp/campaign/point-up/marathon/20200802kwzrs/guide/.

* cited by examiner

*Primary Examiner* — Jason Salce

(57) ABSTRACT

A content distribution system comprising: a content distributing unit that distributes a content; a gift receiving unit that receives a request of a gift of which multiple types exist from a viewer when distributing the content; a gift providing unit that executes a process for providing the gift from the viewer; and a reward unit that gives a reward to the viewer, when the viewer provided a plurality of the gifts, according to a combination of the plurality of gifts.

9 Claims, 4 Drawing Sheets

CONTENT DISTRIBUTION SYSTEM, CONTENT DISTRIBUTION METHOD, AND PROGRAM

TECHNICAL FIELD

The present invention relates to a content distribution system, a content distribution method, and a program.

BACKGROUND ART

There are known systems for providing gifts such as celebrations and gifts to content performers (see Patent Literature 1).

CITATION LIST

Patent Literature

[PTL 1] Japanese Patent Application Publication No. 2012-120098

SUMMARY OF INVENTION

Technical Problem

The viewer is not motivated to provide gifts.

The present invention has been made in light of this background, and is intended to provide a technology that can motivate viewers to provide gifts.

Solution to Problem

The principal invention for solving the above-described problems is a content distribution system comprising: a content distributing unit that distributes a content; a gift receiving unit that receives a request of a gift of which multiple types exist from a viewer when distributing the content; a gift providing unit that executes a process for providing the gift from the viewer; and a reward unit that gives a reward to the viewer, when the viewer provided a plurality of the gifts, according to a combination of the plurality of gifts.

The other problems disclosed in the present application and the method for solving them are clarified in the embodiments of the invention and drawings.

Advantageous Effects of Invention

According to the present invention, it is possible to motivate the viewer to provide a gift.

DESCRIPTION OF EMBODIMENTS

Outline of the Invention

Figure 1:
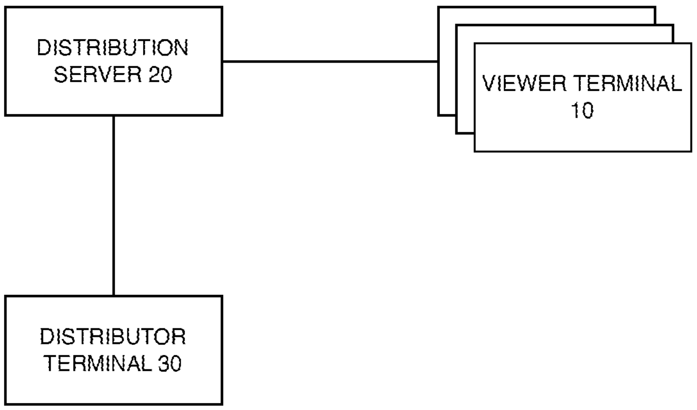
FIG. 1 is a diagram illustrating an example of an overall configuration of the distribution system according to the present embodiment.

The contents of embodiments of the present invention will be described with reference. The present invention includes, for example, the following configurations.

[Item 1]

A content distribution system comprising:

a content distributing unit that distributes a content;

a gift receiving unit that receives a request of a gift of which multiple types exist from a viewer when distributing the content;

a gift providing unit that executes a process for providing the gift from the viewer; and a reward unit that gives a reward to the viewer, when the viewer provided a plurality of the gifts, according to a combination of the plurality of gifts.

[Item 2]

The content distribution system according to the item 1, wherein:

when the viewer provides a combination of two or more identical or different types of the gifts, the reword unit enables the viewer to provide a gift which is different from the gift provided by the viewer according to the combination.

[Item 3]

The content distribution system according to the item 1, wherein:

when the viewer provides a combination of two or more identical or different types of the gifts, the reward unit enables the viewer to purchase a gift which is different from the gift provided by the viewer according to the combination.

[Item 4]

The content distribution system according to the item 1, wherein:

when the viewer provides a predefined combination of the two or more gifts, the reword unit enables the viewer to provide a gift which is different from the gift provided by the viewer.

[Item 5]

The content distribution system according to the item 1, wherein:

when the viewer provides a combination of two or more identical or different types of the gifts, the reword unit changes a display on the viewer's screen to a predefined display.

[Item 6]

The content distribution system according to the item 5, wherein:

when the viewer further provides a predetermined combination of the two or more gifts after changing the display on the viewer's screen to the predetermined display, the reward unit enables the viewer to provide a gift which is different from the gift provided by the viewer.

[Item 7]

The content distribution system according to the item 5, wherein:

when the viewer further provides a predetermined combination of the two or more gifts after changing the display on the viewer's screen to the predetermined display, the reward unit causes a predetermined event to occur.

[Item 8]

The content distribution system according to the item 1, wherein:

the gift is sold to the viewer, and when a total amount of the gift purchased by the viewer reaches a predetermined value, the reword unit enables the viewer to provide a gift which is different from the gift provided by the viewer according to the combination.

[Item 9]

The content distribution system according to the item 1, wherein:

a number of points is set for the gift, and when a total amount of the points set for the gift provided by the viewer reaches a predetermined value, the reword unit enables the viewer to provide a gift which is different from the gift provided by the viewer according to the combination.

[Item 10]

The content distribution system according to the item 1, wherein:

a gift proposing unit that proposes the gift that the viewer can purchase; and a related gift storage unit that stores a related gift which is associated with the gift;

wherein when a predetermined gift is purchased, the gift proposing unit identifies the related gift corresponding to the predetermined gift from the related gift storage unit and proposes the identified related gift to the viewer who purchased the predetermined gift.

<System Overview>

Hereinafter, a distribution system according to one embodiment of the present invention will be described. FIG. 1 is a diagram illustrating an example of an overall configuration of the distribution system according to the present embodiment. The distribution system of this embodiment includes the distribution server 20. The distribution server 20 is communicatively connected via a communication network with each of the plurality of the viewer terminal 10 and the distributor terminal 30. The communication network is, for example, the Internet and may be constructed from a public telephone network, a cellular telephone network, a wireless communication line, an Ethernet (registered trademark), or the like.

In the distribution system of the present embodiment, it is assumed that the content of the video and audio is distributed from the distribution server 20. During content delivery, the viewer may provide a gift to the performer (may be distributor, the same shall apply hereinafter). In the delivery system of the present embodiment, the gift to be provided is determined by lot. In addition, the viewer is rewarded for the combination of gifts provided by the viewer.

The distribution server 20 may be a general-purpose computer, such as a workstation or personal computer, or may be logically implemented by cloud computing. The distribution server 20 may be, for example, a computer providing video distribution services.

The viewer terminal 10 is a computer that views the content (video and audio are assumed in this embodiment) distributed from the distribution server 20. The viewer terminal 10 may be, for example, a smartphone, a tablet computer, a personal computer, or the like. The viewer terminal 10 may include, for example, a function of a web browser to communicate with the distribution server 20 using HTTP protocol or may execute a viewer application of the delivered video to receive, decode, output, or the like the video and audio being delivered. In addition, in the viewer terminal 10, an input device such as a keyboard or a mouse may be used to transmit a request for distribution of a video or a request for a gift to the distribution server 20.

The distributor terminal 30 is a computer operated by a video distributor. The distributor terminal 30 may be, for example, a personal computer or a smartphone. The distributor terminal 30 may upload, for example, images and sounds taken of performances or performances of the performer to the distribution server 20. The distributor terminal 30 may include a computer operated by the performer and a computer operated by the operator of the delivery.

<Configuration of Distribution Server 20>

Figure 2:
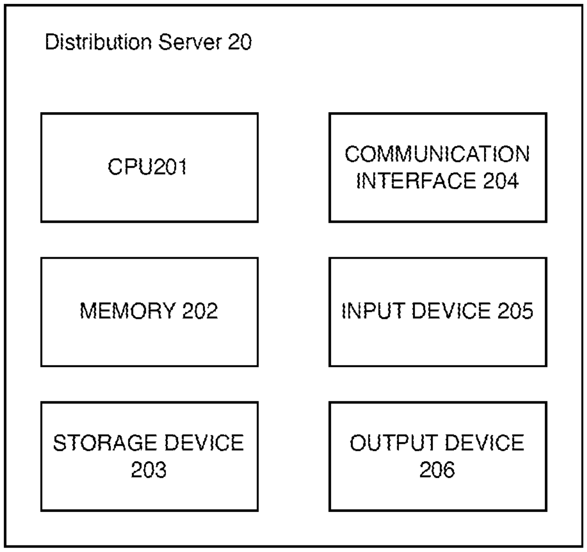
FIG. 2 is a diagram illustrating an example of a hardware configuration of the distribution server 20.

FIG. 2 is a diagram illustrating an example of a hardware configuration of the distribution server 20. The illustrated configuration is exemplary and may have other configurations. The distribution server 20 includes a CPU 201, a memory 202, a storage device 203, a communication interface 204, an input device 205, and an output device 206. The storage device 203 may be, for example, a hard disk drive, a solid-state drive, a flash memory, or the like, for storing various types of data or program. The communication interface 204 is an interface for connecting to a communication network, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 205 may be, for example, a keyboard or mouse, a touch panel, a button, a microphone, or the like, for inputting data. The output device 206 may be, for example, a display, a printer, a speaker, or the like, for outputting data. The functional units of the distribution server described later are realized by reading a program stored in the storage device 203 to the memory 202 and executing it, and each storage unit of the distribution server is realized as a part of the storage area provided by the memory 202 and the storage device 203.

Figure 3:
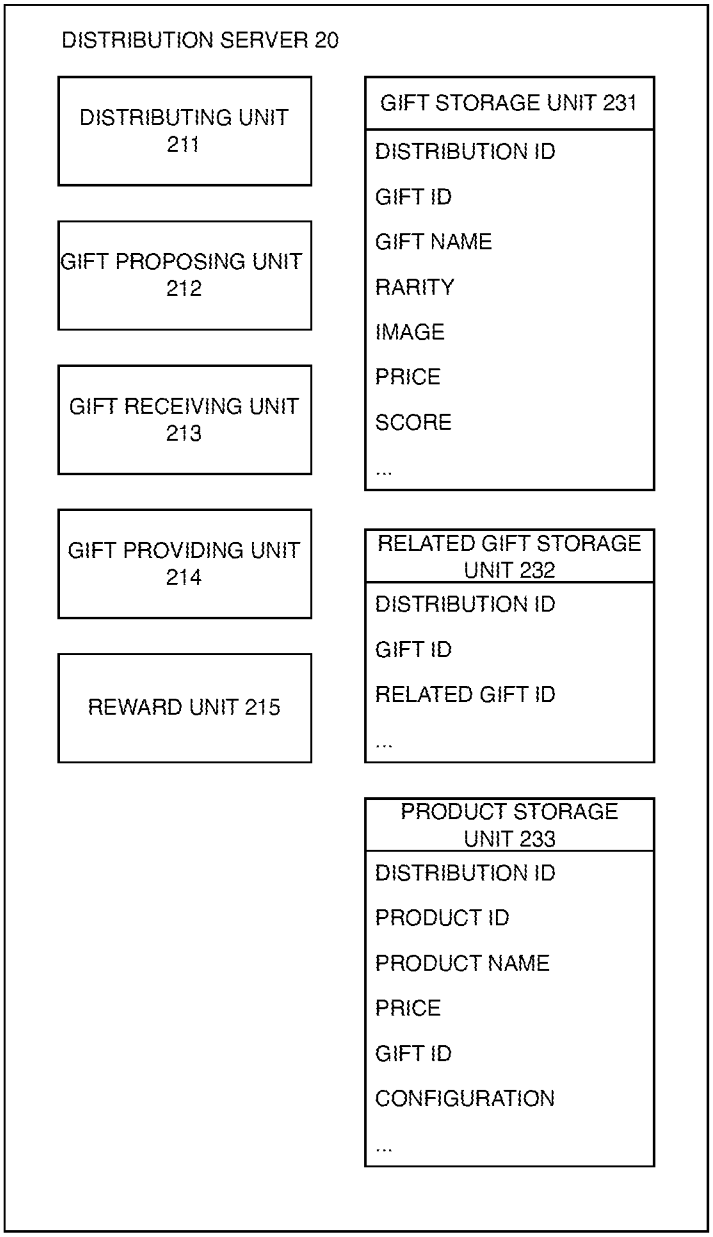
FIG. 3 is a diagram illustrating an example of a software configuration of the distribution server 20.

FIG. 3 is a diagram illustrating an example of a software configuration of the distribution server 20. The distribution server 20 includes a gift storage unit 231, a related gift storage unit 232, a product storage unit 233, a distributing unit 211, a gift proposing unit 212, a gift receiving unit 213, a gift providing unit 214, and a reward unit 215.

The gift storage unit 231 stores information pertaining to the gift that can be provided to the performer (hereinafter referred to as the gift information). There are several types of gifts. The gift information may include, for example, a distribution ID identifying the distribution program of the content, a gift ID representing the gift, the name of the gift (gift name), the rarity of the gift, the image of the gift, the price of the gift, the score of the gift, and the like. The image represents that a gift (a product) is provided by the viewer to the performer on the delivery program. The image may be an image of the product or may be an image unrelated to the product. The product may be money. The price is the amount at which the gift is sold to the viewer. The score is the weight for the gift and can be any number.

The related gift storage unit 232 stores information related to a related gift that is related to the gift (hereinafter referred to as the related gift information). The related gift information may include a distribution ID identifying the distribution, a gift ID indicating the gift, and a related gift ID indicating a related gift associated with the gift.

The distributing unit 211 distributes the content. For the content distribution processing by the distributing unit 211, the technology used in the general video distribution service, or the like can be used.

The gift proposing unit 212 proposes a gift that can be purchased by the viewer. The gift proposing unit 212 may, for example, propose a list of gift information stored in the gift storage unit 231 to the viewer. The gift proposing unit 212 may only propose what is less than a predetermined rarity. The gift proposing unit 212 may allow the viewer to choose a gift to be provided to the performer from the proposed gifts.

When a predetermined gift is purchased, the gift proposing unit 212 may identify the related gift ID corresponding to the predetermined gift from the related gift storage unit 232, read out the gift information corresponding to the identified relevant gift ID from the gift storage unit 231, and propose a gift pertaining to the read gift information to the viewer who purchased the predetermined gift.

The gift receiving unit 213 receives an application for gift from a viewer during distributing the content. The gift receiving unit 213 can accept multiple applications for gifts from viewers when distributing the content.

The gift providing unit 214 performs the processing of providing the gift from the viewer. The gift providing unit 214 can make the distributing unit 211 to perform the distribution so that the information representing the gift is displayed on the screen of the viewer terminal 10 together with the content. In addition, the gift providing unit 214 can make the distributing unit 211 to perform the distribution so that the gifts, which is allocated by lot to a plurality of viewers and is provided, are displayed on the screen of the viewer terminal 10. The gift providing unit 214 may also display the gift proposed by the viewer in the comment field displayed on the viewer terminal 10. The amount of the gift may also be indicated.

The reward unit 215 may give a reward to the viewer when the viewer provides multiple gifts. The reward unit 215 may provide a reward to the viewer in accordance with a combination of gifts provided by the viewer. The reward may be money, points, coupons, or other gifts.

The reward unit 215 may provide a viewer with a different gift than the gift provided by the viewer, according to the combination, if the viewer provides two or more identical or different types of gifts. The gift is given to the viewer by setting configuration to allow the viewer to provide the gift to the performer.

The reward unit 215 may also set configuration to allow the viewer to purchase a gift different from the gift provided by the viewer, according to the combination, if the viewer provides two or more identical or different types of gifts. Setting configuration to allow the viewer to purchase a gift may be that the gift proposing unit 212 proposes the gift to the user.

The reward unit 215 may also set configuration to allow the viewer to provide a different gift than the gift provided by the viewer if the viewer provides a predetermined combination of two or more gifts.

The reward unit 215 may also change the display on the viewer's screen to a predetermined display when the viewer provides two or more identical or different types of gifts.

After changing the display on the viewer's screen to a predetermined display, the reward unit 215 may also set configuration to allow the viewer to provide a different gift than the gift provided by the viewer if the viewer provides a predetermined combination of further more than two gift. For example, the gift providing unit 214 may, when the gift is provided by the viewer to the performer, change the display color of the viewer's user name, display a predetermined icon on the viewer's user name, display the viewer's user name in the comment field, and change the color or image of the screen background or a particular object, and further while such display is being made, the gift proposing unit 212 may propose additional gifts and, when a proposed gift is purchased, rewards the viewer.

The reward unit 216 may also generate a predetermined event when the viewer provides a predetermined combination of two or more gifts after changing the display on the viewer's screen to a predetermined display. The predetermined event may include, for example, displaying a predetermined image as a presentation on the distributed image, including a predetermined voice in the voice included in the distributed image, or displaying a predetermined image on a screen other than the distributed image on the viewer terminal 10.

The reward unit 216 may also set configuration to allow the viewer to provide a gift different from the gift provided by the viewer when the total amount of gifts purchased by the viewer reaches a predetermined value.

The reward unit 216 may also set configuration to allow the viewer to provide a gift different from the gift provided by the viewer when the total of scores set for the gift provided by the viewer reaches a predetermined value.

<Action>

Figure 4:
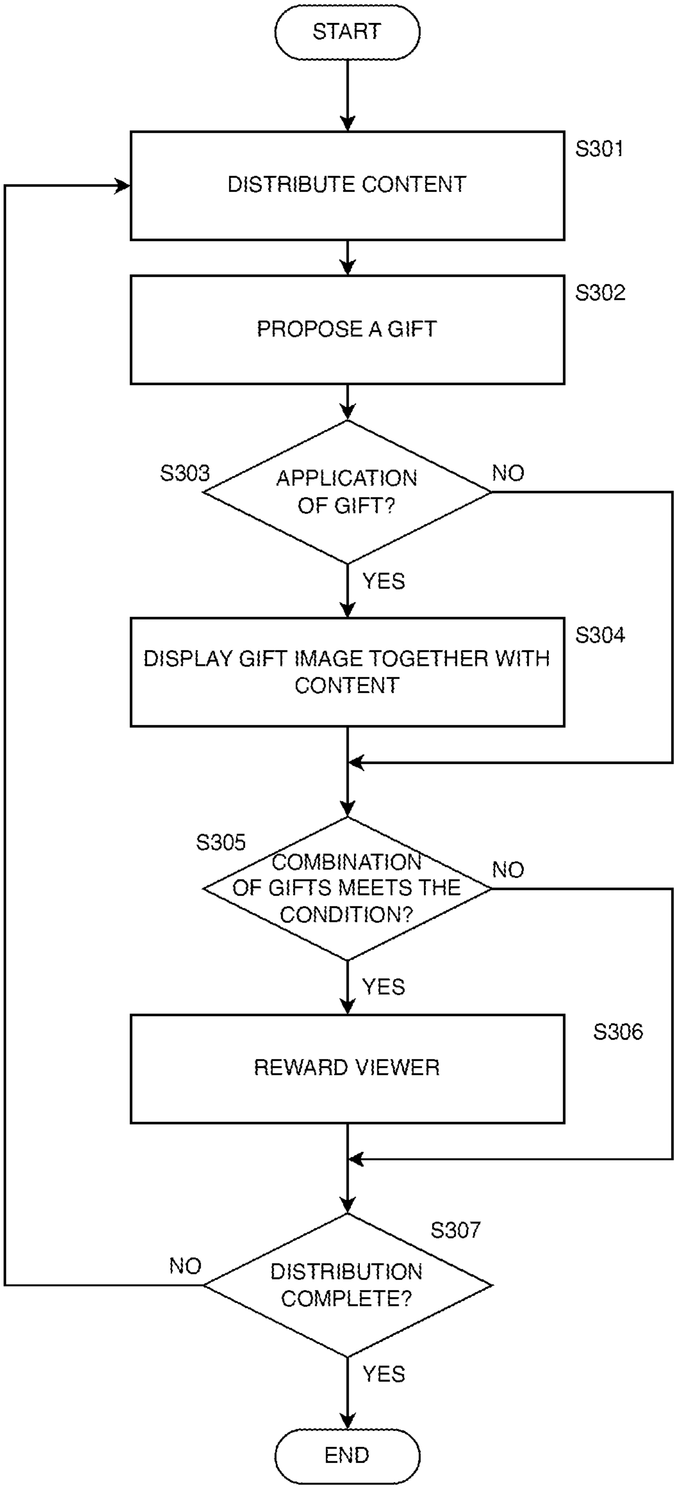
FIG. 4 is a diagram illustrating the operation of the distribution system according to the present embodiment.

FIG. 4 is a diagram illustrating the operation of the distribution system according to the present embodiment.

The distribution server 20 distributes the content (S301), proposes a list of purchasable gifts to the viewer terminal 10 during the content distribution (S302), and if the application of the gifts selected from the gifts proposed by the viewer terminal 10 are received (S303:YES), directs the appearance so that the gifts which was applied and provided to the performer are displayed together with the content on the viewer terminal 10 (S304).

If the viewer purchases multiple gifts and the combination of multiple gifts purchased meets the predetermined condition (S305:YES), the distribution server 20 rewards the viewer (S306). A reward may include, for example, allowing a viewer to provide different gift.

The distribution server 20 repeats the processing from step S301 until the completion of distribution (S307:NO).

As described above, according to the content distribution system of the present embodiment, it is possible to reward the viewer according to the combination of gifted gifts.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in this embodiment, the gift that the viewer can provide to the performer is determined by lot, but the gift proposing unit 212 may propose the gift to the viewer rather than the lot. In this case, the gift proposing unit 212 can read out the gift information of a predetermined rarity from the gift storage unit 231 and propose the gift pertaining to the gift information to the user. When the gift is purchased, the gift proposing unit 212 can identify the related gift ID corresponding to the purchased gift from the related gift storage unit 232, read out the gift information corresponding to the identified related gift ID from the gift storage unit 231, and propose the gift pertaining to this gift information to the user.

REFERENCE SIGNS LIST

10 Viewer Terminal
20 Distribution Server
30 Distributor Terminal

The invention claimed is:

1. A content distribution system comprising:

a content distributing unit that distributes a content;

a gift receiving unit that receives a request of a gift of which multiple types exist from a viewer when distributing the content;

a gift providing unit that executes a process for providing the gift from the viewer; and a reward unit that gives a reward to the viewer, wherein the reward unit stores a predefined combination including a set of at least two different gift types, wherein the reward unit determines whether or not the predefined combination is satisfied only when all of the different gift types in the set have been provided by the viewer, and wherein, in response to the predefined combination being satisfied, the reward unit enables a reward gift type to be selected and provided by the viewer, the reward gift type being a gift type that was not available to the viewer before the predefined combination was satisfied and is different from each gift type in the predefined combination.

2. The content distribution system according to claim 1, wherein:

when the viewer provides the predefined combination, the reward unit enables the viewer to purchase the reward gift type as the reward.

3. The content distribution system according to claim 1, wherein:

when the viewer provides the predefined combination, the reward unit enables the viewer to provide the reward gift type as the reward.

4. The content distribution system according to claim 1, wherein:

when the viewer provides the predefined combination, the reward unit changes an appearance on the viewer's screen to a predefined appearance.

5. The content distribution system according to claim 4, wherein:

when the viewer further provides a predetermined combination of two or more gifts after changing the appearance on the viewer's screen to the predefined appearance, the reward unit enables the viewer to provide a further reward gift type that is different from the gifts provided by the viewer.

6. The content distribution system according to claim 4, wherein:

when the viewer further provides a predetermined combination of two or more gifts after changing the appearance on the viewer's screen to the predefined appearance, the reward unit causes a predetermined event to occur.

7. The content distribution system according to claim 1, wherein:

the gift is sold to the viewer, and when a total amount of the gift purchased by the viewer reaches a predetermined value, the reward unit enables the viewer to provide a gift which is different from the gifts previously provided by the viewer.

8. The content distribution system according to claim 1, wherein:

a number of points is set for the gift, and when a total amount of the points set for the gift provided by the viewer reaches a predetermined value, the reward unit enables the viewer to provide a gift which is different from the gifts previously provided by the viewer.

9. The content distribution system according to claim 1, further comprising:

a gift proposing unit that proposes a gift that the viewer can purchase; and a related gift storage unit that stores a related gift which is associated with said gift;

wherein when a given gift is purchased, the gift proposing unit identifies the related gift corresponding to the given gift from the related gift storage unit and proposes the identified related gift to the viewer, and wherein the identified related gift is proposed to the viewer to assist the viewer in providing the predefined combination.

* * * * *